United States Patent [19]

Howard et al.

[11] Patent Number: 4,643,752
[45] Date of Patent: Feb. 17, 1987

[54] FRESNEL LENS FABRICATION

[75] Inventors: Richard E. Howard, Holmdel; Paul F. Liao, Fair Haven; Rogers H. Stolen, Rumson, all of N.J.

[73] Assignee: AT&T Bell Laboratories, Murray Hill, N.J.

[21] Appl. No.: 737,912

[22] Filed: May 28, 1985

Related U.S. Application Data

[60] Division of Ser. No. 671,039, Nov. 15, 1984, abandoned, which is a continuation of Ser. No. 490,328, May 2, 1983, abandoned.

[51] Int. Cl.[4] .................................................. G02B 3/08
[52] U.S. Cl. .......................................... 65/3.15; 65/3.2; 65/60.5; 65/60.53; 264/1.7; 350/417; 350/452
[58] Field of Search ................. 65/3.11, 3.2, 31, 3.12, 65/3.15, 3.14, 18.1, 18.2, 60.5, 60.53; 350/417, 451, 452, 320, 96.33; 264/1.7, 134, 145, 151

[56] References Cited

U.S. PATENT DOCUMENTS

| 4,025,965 | 5/1977 | Siegmund | 264/1.7 X |
| 4,149,772 | 4/1979 | Iyengar et al. | 350/96.33 |
| 4,203,744 | 5/1980 | Schultz et al. | 65/3.11 |
| 4,243,398 | 1/1981 | Nomura et al. | 65/3.12 X |
| 4,338,005 | 7/1982 | Cohen | 350/452 X |

Primary Examiner—Kenneth M. Schor
Attorney, Agent, or Firm—David R. Padnes

[57] ABSTRACT

A Fresnel lens is fabricated by depositing concentric layers of first and second materials in alternation on a substrate surface. The substrate and deposited layers are then drawn down to provide a predetermined Fresnel lens zone structure.

8 Claims, 7 Drawing Figures

FRESNEL LENS FABRICATION

This application is a division of application Ser. No. 671,039, filed Nov. 15, 1984, now abandoned, which was a continuation of application Ser. No. 490,328, filed May 2, 1983, now abandoned.

TECHNICAL FIELD

The present invention relates to the fabrication of Fresnel lenses and, more particularly, to a method which adapts optical fiber manufacturing techniques to the fabrication of Fresnel lenses.

BACKGROUND OF THE INVENTION

Fresnel lenses, also known as zone plates or Fresnel-zone plates, have long been used to focus electromagnetic radiation. Typically, such a lens comprises many concentric annular rings or zones which provide the desired focusing by selective absorption or selective phase shifting of the electromagnetic radiation. In the absorption mode, selected zones absorb the impinging radiation in a manner which precludes destructive interference at the focal point. Similarly, in lenses designed to operate in the phase shift mode, an appropriate phase shift is imparted to the electromagnetic radiation propagating through selected zones relative to the electromagnetic radiation propagation through other zones so that all of the radiation emanating from the lens is in phase at the focal point.

A variety of materials have been used to fabricate Fresnel lenses which focus electromagnetic radiation selected from the visible and nonvisible portions of the spectrum. Prior art techniques for fabricating Fresnel lenses comprise etching of zones in the planar surface of a material which is transparent to the electromagnetic radiation. This is then followed by depositing absorbing or phase shifting material into the etched zones. While this technique works satisfactorily for some lens applications, it is difficult to provide thin width outer zones in large diameter lenses or in thick lenses. This limitation is significant as it is well known that the spatial resolution of a Fresnel lens may be increased by using short wavelength electromagnetic radiation and by decreasing the width of the outermost zone. Accordingly, it would be desirable to focus X rays through a Fresnel lens in applications where high resolution is desired. The problem with fabricating Fresnel lenses that focus X rays, however, is that the required lens thickness and a thin width outermost zone for high resolution are extremely difficult to achieve.

SUMMARY OF THE INVENTION

In accordance with the present invention, the prior art problems in fabricating Fresnel lenses are overcome by forming concentric layers of alternating materials on a substrate surface. The thickness of each layer is adjusted to be a multiple of a corresponding zone width. The substrate and deposited layers are then drawn down to the desired Fresnel lens size. It is an aspect of the present invention that the materials deposited can directly form the Fresnel lens or, alternatively, one of the materials can be etched to define areas for depositing suitable electromagnetic radiation absorbing or phase shifting material.

DETAILED DESCRIPTION

Figure 1:
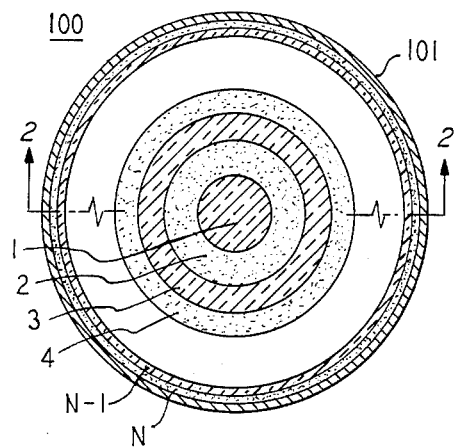
FIG. 1 is a representation, greatly enlarged, of a Fresnel lens comprising many annular zones.
Figure 2:
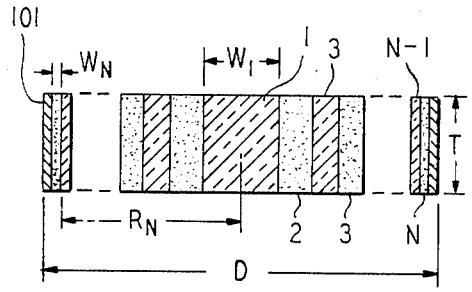
FIG. 2 is a sectional view of FIG. 1 taken along section line 2—2.

As shown in FIGS. 1 and 2, an exemplary Fresnel lens 100 fabricated in accordance with the present invention has a diameter D, thickness T and comprises a predetermined number of annular rings or zones of ever-increasing radii. While the number of rings, N, can be any integer, N=125 for lens 100. By convention, the number of a particular ring increases with distance from the lens center. To provide the desired focusing, the material composition of the zones alternates between first and second materials. In lens 100, odd-numbered zones 1, 3 ... N are fabricated of a first material, while even-numbered zones 2, 4 ... (N−1) are fabricated of a second material. The widths of zones 1 to N are designated as $W_1$ to $W_N$, respectively, and these widths decrease with increasing radius. As will be described more fully hereinbelow, a drawn substrate 101 surrounds the outermost zone N.

The relation between the inner radius $R_n$ of any zone n from 1 to N, the wavelength $\lambda$ of the electromagnetic radiation to be focused, and the resulting focal length f may be represented with very close approximation by:

$$R_n^2 = f\lambda n \qquad (1)$$

and the cross-sectional area of each zone is equal to $\pi f\lambda$.

A Fresnel lens focuses incident radiation by utilizing a material for either the even-numbered or odd-numbered zones which absorbs the incident radiation that would otherwise destructively interfere at the focal point or provides an index of refraction whereby the radiation emanating from the lens is aligned in phase at the focal point.

In accordance with the present invention, the illustrated lens of FIGS. 1 and 2 is fabricated by forming a concentric, multilayered structure on a cylindrical substrate which when reduced in size forms the desired Fresnel lens. Deposition of the material layers can be accomplished using any of a number of techniques and is facilitated by the fact that the volume of material deposited per unit length for each zone is the same. After deposition of all layers, the preform, i.e., the substrate and formed layers, are drawn down until the required Fresnel zone structure is attained. As will be discussed, the preform is sometimes collapsed prior to drawing. Drawing advantageously provides thin width zone for good spatial resolution over any lens thickness T. Moreover, the surface tension on the preform during drawing enhances the concentricity of the zones to further improve lens operation.

Figure 3:
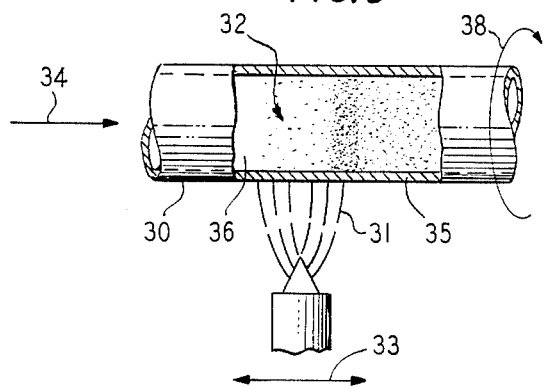
FIG. 3 is a front elevational view of a section of a tubular substrate within apparatus for depositing the alternating material layers in a Fresnel lens preform.

FIG. 3 illustrates one applicable deposition process known as modified chemical vapor deposition or MCVD applied to the fabrication of a Fresnel lens. As shown, tubular substrate 30 is heated by heating means 31 to produce hot zone 32. Hot zone 32 traverses substrate 30 in direction 33 by movement of heating means 31 in direction 33 by apparatus not shown. Uniform heating of tubular substrate 30 is advantageously provided by substrate rotation in direction 38. Gaseous material is introduced at the left end of tubular substrate 30 and flows in the direction shown by arrow 34. Two regions are clearly observable within tubular substrate 30. Region 35 downstream of hot zone 32 is filled with a moving powdery substance of particulate oxidic material, while region 36, devoid of such particulate material, defines the region within which fusion of deposited material is occurring. By alternating between the gases introduced, the alternating layers of first and second materials can be formed on the inner circumferential wall of substrate 30. It should of course be understood that the concentric alternating material layers could be deposited on the outer circumferential wall of tubular substrate 30 or on the circumferential wall of a solid cylindrical substrate. In either of these two alternatives, the substrate would be located at the center of the Fresnel lens and would be surrounded by the concentric zone structure. Regardless of the substrate or surface chosen for deposition, the material deposited for each zone is a multiple of that required for the Fresnel lens.

After depositing the N layers of first and second materials, the preform is drawn down to substantially the diameter D of the Fresnel lens. The drawing operation can be facilitated, for the case of a hollow substrate 30, by collapsing the preform prior to drawing. As in optical fiber manufacture, such collapsing can be accomplished by heating the substrate 30.

Figure 4:
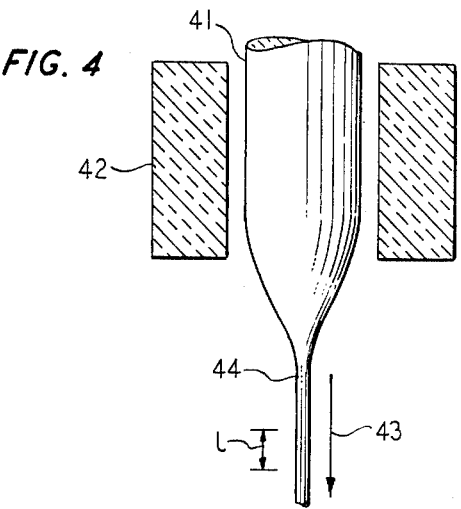
FIG. 4 is a sectional view of apparatus for drawing the Fresnel lens preform.

FIG. 4 illustrates the drawing operation wherein a lens preform 41 is placed in furnace 42 as it is pulled in direction 43 until the diameter of the preform is reduced to Fresnel lens diameter D. This reduction in diameter is accompanied by a corresponding reduction of the deposited layers down to zone widths $W_1$ through $W_N$.

The drawn preform is then allowed to cool and a section of length l is cut along the drawn diameter segment 44. Dimension l can be equal to the thickness T of Fresnel lens 100 but is preferably slightly larger to allow for material removed during subsequent polishing and lapping of the lens end faces.

Figure 5:
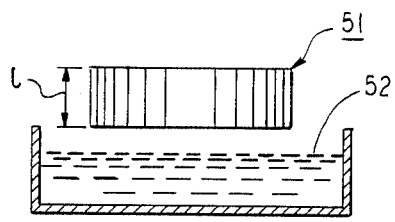
FIG. 5 is a sectional view of apparatus illustrating a step in a modified process for making a Fresnel lens.

FIG. 5 illustrates a modification of the above-described fabrication process in which the first and second deposited materials have substantially different etching rates in the same etchant. Table 1 below lists a number of glass compositions and their respective etch rates in common etchants. As shown, the first and second materials for lens fabrication can be selected from this table having etch ratios as great as 100 or more for a particular etchant.

TABLE 1

| Glass type composition | Etch rate at 25° C. (μm/min) | | |
|---|---|---|---|
| | HF—H$_2$O* | HF—HNO$_3$—H$_2$O** | BHF*** |
| Zinc borosilicate | 39.1 | 28.6 | 0.080 |
| Lead borosilicate | 9.7 | 10.0 | 0.09 |
| Barium alumino-silicate | 9.0 | 4.7 | 0.16 |
| Calcium alumino-silicate | 7.5 | 3.0 | 0.22 |
| Aluminoborosilicate | 6.0 | 5.4 | 0.13 |

TABLE 1-continued

| Glass type composition | Etch rate at 25° C. (μm/min) | | |
|---|---|---|---|
| | HF—H$_2$O* | HF—HNO$_3$—H$_2$O** | BHF*** |
| Calcium alumino-silicate | 5.6 | 1.8 | |
| Alkali zinc boro-silicate | 5.5 | 2.4 | |
| Calc.magn.alumi-noborosilicate | 4.3 | 2.6 | |
| Barium alumino-borosilicate | 3.2 | 2.7 | 0.6 |
| Borosilicate | 3.2 | 1.9 | 0.040 |
| Borosilicate | 1.9 | 1.9 | 0.063 |
| CVD (450° C.) silica film | 1.80 | 0.44 | 0.48 |
| Aluminoborosilicate | 1.7 | 1.8 | |
| Thermally grown silica film | 0.30 | 0.11 | 0.11 |
| Fused natural silica | 0.29 | 0.15 | 0.12 |

*1 vol HF 49% + 1 vol H$_2$O.
**20 vol HF 49% + 14 vol HNO$_3$ 70% + 66 vol H$_2$O.
***454 g NH$_4$F (crystal) + 654 ml H$_2$O + 163 ml HF 49%.

Figure 6:
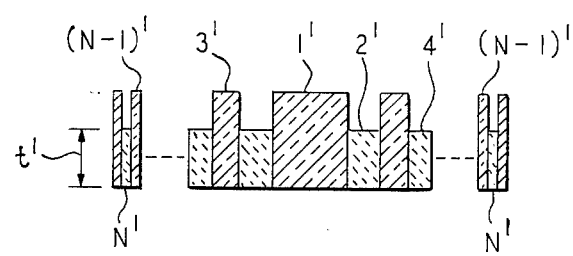
FIG. 6 is a sectional view through the center of a Fresnel lens after the step of FIG. 5.

Accordingly, as illustrated in FIG. 5, a drawn segment 51 of length l can be dipped in a predetermined etchant 52 to yield Fresnel lens 100' shown in FIG. 6. In lens 100', the thickness of each even-numbered zone 2', 4', 6' ... (N−1)' is considerably less than that of the odd-numbered zones 1', 3' ... N'. Absorption coefficient and indices of refraction of the listed materials are well known at optical wavelengths. At shorter wavelengths, in particular X rays, the index of refraction for a given material composition can be estimated from the atomic composition using the atomic scattering factors published by Henke et. al., American Institute of Physics Conference Proceedings, No. 75, 1981. Consequently, the alternating thicknesses of layers 1' through N' can be adjusted to provide the requisite phase shift or absorption for a Fresnel lens. Or, alternatively, material which provides the necessary phase shift or absorption can be filled in the etched zones 2', 4' ... (N−1)' to provide the necessary absorption.

Figure 7:
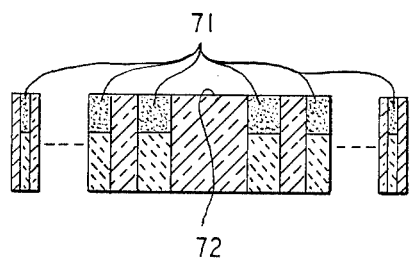
FIG. 7 is a sectional view of FIG. 6 after plating with absorbing or phase shifting material.

FIG. 7 illustrates a structure wherein strongly attenuating material 71, such as gold or tungsten, is deposited within even-numbered zones 2' through N−1' in a manner which yields a planar end face 72. The filling of the etched regions can be accomplished by a variety of processes such as electroless plating, sputtering, or chemical vapor deposition. If desired, even-numbered zones could be completely etched away and refilled with appropriate material. Complete etching away of the even-numbered zones requires mounting of segment 51 on a planar surface prior to etching. The nature of the deposition processes will determine the extent to which the top of the deposited layer will conform to the underlying surface. If the top surface of the filled-in material is nonplanar, as would be the case for sputtering, the deposited material would be of equal thickness and the formation of planar surface 72 would require etching or polishing.

Using the above-described technique, a variety of Fresnel lenses can be fabricated.

EXAMPLE 1

A Fresnel lens having a focal length of 0.67 centimeter which operates in the absorption mode for X rays having a wavelength of 7.5 Angstroms can be made by depositing alternating layers of GeO$_2$ and SiO$_2$ doped with about 30 percent mole weight of B$_2$O$_3$. The GeO$_2$ is the absorbing material and the SiO₂ doped material is the nonabsorbing material. The boron doping of the SiO₂ facilitates drawing by lowering the melting point of the SiO₂ to approximately match that of GeO₂.

Using a 0.447 cm diameter rod of either GeO₂ or doped SiO₂ (as above) and following equation (1) set forth above, the thickness of the first zone is 0.0926 centimeters. After 125 zones, the thickness of the outermost zone is 100 microns. If this preform is then drawn down a 1000 times, the rod diameter becomes 4.4 microns and the outer zone has a width of 0.1 microns.

The X-ray attenuation coefficient, $\alpha$, can be estimated by:

$$\alpha = 2r_o \sum_1 \bar{n_i} f_{2i} \qquad (2)$$

where $r_o = 2.8 \times 10^{-13}$ cm, the classical electron radius;
$n_i$ is the number of atoms/cm³ of atom i; and
$f_{2i}$ is the atomic scattering factor of atom i from published tables by Henke et. al., *American Institute of Physics Conference Proceedings*, No. 75, 1981.

Accordingly, $\alpha$ for the SiO₂+30 percent mole weight of B₂O₃ is $1.2 \times 10^3$ cm$^{-1}$ and $\alpha$ for the GeO₂ is $10^4$ cm$^{-1}$. With these coefficients, the ratio of radiation transmission through the absorbing and nonabsorbing zones are 100 to 1 for a 5 micron thick lens.

EXAMPLE 2

A Fresnel lens which operates in the phase shift mode can be fabricated, as in Example 1, by selecting materials which have a different index of refraction such that:

$$(n_A - n_B)T = \frac{\lambda}{2} ; \qquad (3)$$

where $n_A$ is the index of refraction of the first material;
$n_B$ is the index of refraction for the second material;
T is the lens thickness; and
$\lambda$ is the incident radiation wavelength.

By choosing SiO₂ doped with 20 percent mole weight of B₂O₃ and undoped SiO₂ for the first and second materials, incident radiation having a $\lambda = 124$ Angstroms is focused with a 3.7 micron thick lens.

It should, of course, be understood to those skilled in the art that the preceding description is merely illustrative and that numerous modifications may be made therein without departing from the spirit and scope of the invention. First, for example, either one of the two material layers may be deposited first. Second, the number of material layers may equal the number of zones or, by use of an appropriate substrate as a zone, may be less than the number of zones.

What is claimed is:

1. A method of fabricating a Fresnel lens, said lens having an electromagnetic radiation focusing cross-sectional geometry, comprising a plurality of concentric zones and wherein each of said zones has a predetermined width with the width of each zone decreasing with increasing radius, said method comprising the steps of providing a first material and a second material different from the first, at least one of said materials propagating electromagnetic radiation impinging thereon, forming alternating layers of said first material and layers of said second material on a substrate, all of said first and said second material layers being concentric and each of said second material layers being formed over an immediately preceding one of said first material layers, each of said first and second material layers having a predetermined thickness in a direction substantially perpendicular to a longitudinal axis of said substrate, drawing the substrate and said first and second material layers down until the thickness of each of said first and second material layers is substantially equal to the width of a different one of said zones, where each layer corresponds to each zone, taken in the radially outward direction, said drawing providing a Fresnel lens preform of predetermined diameter having said radiation focusing cross-sectional geometry upon subsequent cutting, etching and depositing, cutting a predetermined length of said preform to define two planar end faces, etching alternate ones of said layers, the unetched layers being material which propagates the electromagnetic radiation propagating therethrough, and depositing a third material into said etched layers, said third material being different from said first and second materials and said third material either absorbing or phase-shifting the electromagnetic radiation impinging thereon so that said third material and the unetched material provide focusing of electromagnetic radiation propagating through said two end faces and thereby form said Fresnel lens.

2. The method of claim 1 wherein said substrate is a tube.

3. The method of claim 1 wherein said substrate is a solid cylinder.

4. The method of claim 1 wherein said third material is adapted to shift the phase of incident radiation of a predetermined wavelength relative to the unetched material.

5. The method of claim 1 wherein said third material is adapted to absorb substantially all of the radiation of a predetermined wavelength passing therethrough.

6. The method of claim 1 wherein the number of first and second material layers formed is equal to said plurality of concentric zones.

7. The method of claim 1 wherein the number of first and second material layers is less than said plurality of concentric zones.

8. The method of claim 2 further comprising the step of collapsing said formed first and second material layers prior to drawing.

* * * * *